United States Patent
Ludwig et al.

(10) Patent No.: US 12,484,136 B2
(45) Date of Patent: Nov. 25, 2025

(54) X-RAY GENERATOR AND X-RAY APPARATUS

(71) Applicant: Siemens Healthineers AG, Forchheim (DE)

(72) Inventors: Patrick Ludwig, Erlangen (DE); Michael Kraus, Forchheim (DE); Christian Hoffmann, Adelsdorf (DE); Clemens Engelke, Nuremberg (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 183 days.

(21) Appl. No.: 18/522,798

(22) Filed: Nov. 29, 2023

(65) Prior Publication Data

US 2024/0224408 A1   Jul. 4, 2024

(30) Foreign Application Priority Data

Dec. 29, 2022   (DE) .................. 10 2022 214 442.2

(51) Int. Cl.
| | |
|---|---|
| *H05G 1/32* | (2006.01) |
| *A61B 6/00* | (2024.01) |
| *H05B 6/66* | (2006.01) |
| *H05G 1/06* | (2006.01) |

(52) U.S. Cl.
CPC ............... *H05G 1/32* (2013.01); *A61B 6/44* (2013.01); *H05B 6/662* (2013.01); *H05G 1/06* (2013.01)

(58) Field of Classification Search
CPC .. H05G 1/02; H05G 1/32; H05G 1/06; H05G 1/10; H05G 1/14
See application file for complete search history.

(56) References Cited

U.S. PATENT DOCUMENTS

| | | | |
|---|---|---|---|
| 2,912,590 A | | 11/1959 | Zabransky |
| 4,039,811 A | * | 8/1977 | Ennslin .................... H05G 1/38 378/112 |
| 2015/0228393 A1 | * | 8/2015 | Waffler ............... H01F 27/2823 336/20 |

(Continued)

FOREIGN PATENT DOCUMENTS

| | | | |
|---|---|---|---|
| CN | 202634870 U | * | 12/2012 |
| DE | 1031437 B | | 6/1958 |

(Continued)

*Primary Examiner* — Casey Bryant
(74) *Attorney, Agent, or Firm* — Harness, Dickey & Pierce, P.L.C.

(57) ABSTRACT

One or more example embodiments relates to an X-ray generator comprising a high-voltage transformer, the high-voltage transformer including a core; a primary winding module including the primary windings enclosing a core in a primary section in a shape of a coil; and a secondary winding module including secondary windings and a plastic section made from a plastic, the secondary windings enclosing the core in a secondary section in the shape of the coil, the plastic section at least one of enclosing or comprising the secondary windings, the plastic forming an electrical insulator, wherein the primary section and the secondary section have a common overlap area, and the high-voltage transformer is configured to at least one of generate a voltage of at least 70 kV with respect to ground or act as a unipolar high-voltage transformer to output a voltage of at least 70 kV.

20 Claims, 5 Drawing Sheets

(56) References Cited

U.S. PATENT DOCUMENTS

2016/0314898 A1    10/2016   Ackermann et al.
2017/0367178 A1    12/2017   Beyerlein et al.

FOREIGN PATENT DOCUMENTS

| | | |
|---|---|---|
| DE | 102014202531 A1 | 8/2015 |
| DE | 102015223534 A1 | 6/2017 |
| EP | 3084782 B1 | 5/2019 |

\* cited by examiner

X-RAY GENERATOR AND X-RAY APPARATUS

CROSS-REFERENCE TO RELATED APPLICATION(S)

The present application claims priority under 35 U.S.C. § 119 to German Patent Application No. 10 2022 214 442.2, filed Dec. 29, 2022, the entire contents of which are incorporated herein by reference.

FIELD

One or more example embodiments of the present invention relates to an X-ray generator with a high-voltage transformer. One or more example embodiments of the present invention further relates to an X-ray apparatus comprising the X-ray generator.

Independent of the grammatical term usage, individuals with male, female or other gender identities are included within the term.

RELATED ART

Transformers, particularly high-voltage transformers, are designed to convert an input voltage and/or input current into an output voltage and/or output current. High-voltage transformers can generate and output voltages in the kilovolt range. Transformers are used in a wide variety of technical areas, such as electric-arc welding, in substations, and/or upstream of electrical devices. High-voltage generators are also required in particular to operate X-ray tubes. High-voltage generators, which are used to operate an X-ray tube, are frequently called X-ray generators and/or are comprised by X-ray generators.

X-ray generators, particularly the high-voltage transformers comprised therein, must generate and output voltages of several kilovolts, especially of at least 60 kV or at least 100 kV. High-voltage transformers for use in X-ray apparatus should preferably be designed to output the voltage with respect to ground, also known as earth, so that an anode of the X-ray tube can operate potential-free. This allows in particular a cooling of the X-ray tube's anode, while the cathode receives the full voltage or high voltage with respect to ground from the X-ray generator.

X-ray generators, especially the high-voltage transformer, must form a galvanic isolation. In other words, X-ray generators must safely separate or isolate the high-voltage side from the low-voltage side, so that people, control modules, a driver circuit, and/or devices in the surrounding area are protected.

High-voltage transformers generally comprise a secondary coil and a primary coil, often also known simply as secondary winding and primary winding, although coils usually comprise multiple windings. The transformers also generally comprise a ferromagnetic core, with secondary and primary coils surrounding the core. The primary coil is supplied with an input voltage and an input current here that varies over time, especially forming an alternating current and/or alternating voltage. The time-varying voltage and/or current in the primary coil generates a time-varying magnetic field, which is amplified or directed by the ferromagnetic core. The time-varying or changing magnetic field of the primary coil penetrates the secondary coil and induces an electromagnetic voltage in this, or generates a current. A different transformation behavior or transformation factor is obtained depending on the ratio of the number of windings of the primary and secondary coil, so that the voltage and/or current can be transformed in accordance with the ratio.

SUMMARY

One or more example embodiments of the present invention provides an X-ray generator that overcomes disadvantages herein mentioned. One or more example embodiments of the present invention provides an X-ray generator for the supply of unipolar high voltage of at least 60 kV. Moreover, a X-ray generator should be suitable for use in computed tomography units and/or C-arms, embodied with rotational stability, for example. It is also the object of the invention to provide an X-ray generator that is embodied with a small or compact design and has a low dead weight.

One or more example embodiments of the present invention provides an X-ray generator and an X-ray apparatus. Particularly preferred embodiments, advantages, and/or effects arise from the dependent claims, the description and the enclosed figures.

BRIEF DESCRIPTION OF THE DRAWINGS

Characteristics, features and advantages and also the way in which these are achieved will become clearer and easier to understand in conjunction with the description of the exemplary embodiments given below, which will be explained in greater detail in conjunction with the drawings. In the drawings here, as schematic diagrams.

DETAILED DESCRIPTION

Independent of the grammatical term usage, individuals with male, female or other gender identities are included within the term.

Strong electromagnetic fields are produced when operating an X-ray generator, especially high voltages and/or currents, meaning that the components of the X-ray generator, or the high-voltage transformer, require electrical insulation. For this purpose, the windings of the coils can be provided with electrically insulating paper and/or the coils and core can be placed in a tank filled with transformer oil. Such insulation measures require and/or result in a bulky and/or heavy structure. Oil-filled transformers and/or the familiar high-voltage transformers often cannot be moved by one person without assistance and/or are unwieldy to transport, and can only be positioned a large distance away from the X-ray tube and/or the patient. The particular disadvantage of this is that because of the necessary large distance from the patient or the X-ray tube, the voltage and/or current output by the secondary side has to be transported over great distances, which means huge losses, heating, and/or long insulated high-voltage cables. Accordingly, a small and/or compact X-ray generator is desirable, so that the distances and/or connections from the high-voltage output and X-ray tube can be kept as low as possible.

Good mechanical stability is important for X-ray generators, especially for use in computed tomography units and/or C-arms. For example, X-ray generators, X-ray apparatus, and/or X-ray tubes in computed tomography units and/or C-arms need to be rotatable and/or mechanically stable against rotation.

Moreover, X-ray generators known to date only have limited suitability for use in emergency medicine, because, as described above, they have a high dead weight and are unwieldy and cumbersome because of their size and/or shape. It is not possible simply to reduce the dimensions and/or the amount of transformer oil, as this has a negative effect on the insulating properties, such as the protection of electrical components, the surrounding area, and/or possible corona discharges.

The subject matter of one or more example embodiments of the present invention is an X-ray generator. The X-ray generator is embodied for use in an X-ray apparatus and/or for connection to an X-ray tube. In particular, the X-ray generator is embodied to supply voltage to an X-ray tube. Specifically, the X-ray generator is part of a computed tomography unit or C-arm. Alternatively and/or additionally, the X-ray generator is embodied for use in a computed tomography unit and/or to supply voltage to a computed tomography unit and/or a C-arm. The X-ray generator is embodied in particular in a rotation-resistant and/or rotationally stable manner.

The X-ray generator comprises a high-voltage transformer or forms a high-voltage transformer. In addition to the high-voltage transformer, the X-ray generator can comprise other modules and/or components, such as a control facility or regulating facility. The X-ray generator, specifically the high-voltage transformer, has an input interface and an output interface. The input interface is designed to supply the X-ray generator with input voltage and/or input current, with the input current and/or input voltage being alternating current and/or alternating voltage in particular. The input current and/or the input voltage is preferably an alternating voltage between 100 and 400 V and/or has a frequency between 30 and 100 Hz. Specifically, the input voltage and/or input current is three-phase current and/or high-voltage current. High voltage is output or supplied by the X-ray generator and/or high-voltage transformer at the output interface, with the high voltage being based on the input voltage and/or the input current. In particular, the output interface is designed to output and/or supply unipolar high voltage. The X-ray generator and/or high-voltage transformer, when used as intended, are in particular externally free of potential and/or voltage, with externally meaning a housing and/or a surface of the X-ray generator (except the interface). Specifically, the X-ray generator can have and/or comprise multiple high-voltage transformers.

The high-voltage transformer comprises a primary winding module, a secondary winding module, and a core. The primary winding module forms a primary side of the high-voltage transformer and/or is part of a primary side of the high-voltage transformer. The primary winding module is connected to the input interface in terms of electricity, voltage and/or current, so that the primary winding module is supplied with the input voltage and/or the input current. The input current and/or input voltage operates the primary winding module to generate an alternating magnetic field. The secondary winding module and the primary winding module are arranged in a way that means they interact electromagnetically, particularly that the magnetic field generated by the primary winding module permeates the secondary winding module at least in part. The secondary winding module is in particular connected electrically and to the voltage and/or current of the output interface, so that high voltage and/or current generated by the secondary winding module can be tapped for further use at the output interface and can be used, for example, to operate the X-ray tube. The secondary winding module forms a secondary side of the high-voltage transformer and/or is part of the secondary side of the high-voltage transformer. In particular, the secondary winding module forms a high-voltage side of the high-voltage transformer.

The core is embodied in particular as a ferrite core. The core is embodied to conduct and/or amplify a magnetic field. The core comprises and/or is made from a ferromagnetic material, such as iron, cobalt or an alloy. The core is embodied and/or arranged to amplify a magnetic field generated by the primary winding module and/or to conduct or bundle this field to the secondary winding module. For example, the core penetrates and/or permeates the primary and secondary winding module, amplifying and/or facilitating a magnetic or electromagnetic interaction between the two modules. The core has in particular no free ends. In other words, the core is preferably a closed frame and/or ring. For example, the core is embodied as a rectangle, polygon, ring-shaped or superelliptical core and/or frame.

The primary winding module comprises at least one primary winding, but specifically multiple primary windings. The primary windings are, for example, coils, windings of an electrical conductor, such as a metal wire or a disc-shaped conductor. The primary winding module comprises in particular a number N1 of primary windings. The primary windings can, for example, be and/or be formed by a wire, such as a copper, silver or alloy wire. The primary windings are embodied in particular to conduct of the input current and/or input voltage, so that the primary current and/or primary voltage are fed in a current flow in the primary winding module, especially through the primary windings. The current flow through the primary windings generates an electromagnetic field, specifically a magnetic field, which is dependent on the primary current or primary voltage. The primary windings form a coil in particular. For example, the primary winding module forms and/or comprises a primary coil encompassing the primary windings.

The primary windings enclose the core in a primary section. The primary section is preferably a straight and/or curve-free section of the core. Alternatively, the primary section can be embodied in a curved manner. The primary windings enclose the core in the primary section in the shape of a coil, such as a cylinder or superellipse. The core is embodied in the shape of a bar in the primary section, for example, preferably with a round or rectangular cross-section, with the primary windings enclosing the bar-shaped core and/or being coiled around it.

The secondary winding module comprises at least one secondary winding, but specifically multiple secondary windings. Moreover, the secondary winding module comprises a plastic section made from a plastic. The secondary windings form and/or comprise a secondary coil. The secondary windings are preferably embodied from an electrical conductor, such as a wire. In particular, the secondary windings are embodied in an identical and/or a similar manner to the primary windings.

The secondary windings enclose the core in a secondary section. The secondary section is preferably embodied in a straight and/or uncurved manner. Alternatively, the secondary section can be embodied in a curved manner. The secondary windings are, for example, coiled around the core in the secondary section. The core forms a bar and/or is embodied in the shape of a bar in the secondary section, for example, particularly with a round or angular, for example rectangular, cross-section, with the secondary windings coiled around the core. The secondary windings form in particular a cylindrical, angular, elliptical, or superelliptical coil around the core in the secondary section. The secondary winding module comprises in particular a number N2 of secondary windings. A transformation ratio of the X-ray generator or the high-voltage transformer arises in particular from the ratio of the number of primary windings N1 to secondary windings N2. In particular, the secondary windings form a hollow body, such as a hollow cylinder for example. In the same way, the primary windings can form a hollow body, such as a hollow cylinder for example.

The plastic section forms a plastic molding and/or a plastic block, for example. Specifically, the plastic section is congruent with and/or similar to the form and/or contour of the secondary windings. For example, the plastic section is embodied as a hollow body, such as a hollow cylinder. The plastic section comprises the secondary windings. The secondary windings are, for example, embedded and/or molded in the plastic. In other words, the plastic section can be formed and/or produced by molding the secondary windings with the plastic. In particular, the secondary windings are molded with the plastic using a mold. Moreover, it is also preferable for the secondary windings to be molded with the plastic in a vacuum, preventing and reducing any air bubbles and/or cavities. The secondary windings are in particular completely enclosed by the plastic.

The plastic is embodied as an electrical insulator. In particular, the plastic is a thermoset, and/or the plastic corresponds to an insulation class and limit temperature pursuant to DIN 0530 Part 1 of at least H. The plastic section, especially the plastic, is embodied and/or arranged to insulate and/or shield a high voltage and/or current of the secondary windings from the surrounding area. The plastic section is permeable to magnetic fields.

The primary section and the secondary section have an overlap, also called an overlap section or overlap area. In other words, the primary section and secondary section are arranged at least in an overlap area or overlap section of the core. The primary section can, for example, completely comprise the secondary section or be identical to this. Alternatively, the secondary section can comprise the primary section. For example, the primary windings and the secondary windings are arranged concentrically to one another, especially concentrically around a common section of the core (primary section, secondary section, overlap area). The plastic section is embodied and/or arranged to insulate the secondary windings electrically from the primary windings and/or the core.

The high-voltage transformer is embodied to generate and/or output a voltage of at least 60 kV, preferably at least 100 kV and specifically at least 120 kV. The voltage is in particular oriented with respect to ground or earth. In other words, the high-voltage transformer is embodied as a unipolar high-voltage transformer. Thus, it is possible to operate an X-ray tube with floating anode, with the complete voltage being applied to the cathode with respect to ground or earth. In other words, the high-voltage transformer is embodied to output a negative voltage of at least 70 kV at the output interface.

One or more example embodiments of the present invention thus provides an X-ray generator that is suitable for operating an X-ray tube. In particular, the X-ray generator according to one or more example embodiments of the present invention allows an X-ray tube to be operated with cooled anode by outputting a voltage of more than 70 kV with respect to ground. The design of the X-ray generator, high-voltage transformer, or secondary winding module facilitates extremely good electrical insulation, so that an X-ray generator is provided with low dead weight, which allows for use in emergency medicine, a computed tomography unit or transportation. Moreover, the design of the X-ray generator, especially the high-voltage transformer, allows the X-ray generator to be positioned extremely close to the X-ray tube and/or the patient, so that transformation to high voltage can occur extremely close to where the X-ray tube is operated, and possible line losses can be reduced. Moreover, the provided X-ray and allows for extremely good galvanic isolation of the high-voltage and low-voltage side or driver and/or control facilities.

There is a provision in particular for the secondary winding module and the core in the secondary section to be decoupled mechanically, in terms of oscillation, and/or vibration. In particular, the plastic section and the core in the secondary section are decoupled mechanically, in terms of oscillation, and/or vibration. In particular, the secondary winding module and core in the secondary section are not materially connected. For example, the secondary winding module in the secondary section is able to slide, rotate and/or move at least within a field of play. For example, the secondary winding module can be connected to and/or arranged with the core so that the secondary winding module is held securely within the field of play, but is nevertheless adjustable, rotatable and/or relatively movable. A secondary winding module connected to the core in this way makes it possible to compensate for vibrations and/or oscillations by adjusting, rotating or sliding. This embodiment allows for the provision of an X-ray generator that can compensate for vibrations, oscillations, and/or mechanical influences from the surrounding area or the X-ray apparatus and that is ideally suited for use in computed tomography units, C-arms, or an emergency clinic.

Specifically, there is provision for the core to comprise at least two molded parts and/or be made from two molded parts. A molded part means in particular a ferromagnetic form element, part, and/or component that forms and/or can form part of the core. In other words, the core comprises and/or is formed from at least or two molded parts. The molded parts are made from iron, cobalt, or an alloy, for example. The molded parts can be produced, for example, by molding, sintering, and/or recasting. For example, the molded parts form two halves of the core. Moreover, the molded parts can be sides, legs, or frame parts of the core. The at least two molded parts, preferably the precisely two molded parts, are connected with a material fit in the secondary section and/or in the primary section. For example, the molded parts are glued, welded, and/or soldered in the secondary section or in the primary section. Furthermore, the molded parts can be screwed together in the secondary section and/or in the primary section. For example, there is provision for the core to hold, support, and/or position the secondary winding module and/or the primary winding module securely and/or form-fit. So that the secondary and/or primary winding module can be produced and/or completed before being supported by and/or secured, or connected to the core, a secure and/or form-fit mounting using a closed frame or core is only possible through the use of at least two molded parts that are then connected together with a material fit. Due to the positioning of the material-fit connection in the secondary section and/or in the primary section, the joint is extremely well protected against environmental influences and/or mechanical strain.

According to an embodiment of the invention, there is a provision for the core, the primary winding module, and/or the primary windings to have a protective layer at least in sections. The protective layer is embodied in particular as an oil-repellent protective layer, specifically to repel a transformer and/or insulating oil. The protective layer forms in particular a shell around the core, the primary winding module, and/or the primary windings. The protective layer is preferably embodied as a continuous protective layer around the core, the primary winding module, and/or the primary windings. Alternatively, the protective layer can be embodied in sections, only covering and/or protecting part of the core, the primary winding module, and/or the primary windings, for example. The protective layer can form, for example, a layer of plastic or varnish, and/or impregnation. The oil-repellent protective layer can specifically be embodied as a film, which is glued or laminated to the core, the primary winding module, and/or the primary windings, for example. Alternatively and/or additionally, the oil-repellent protective layer can be applied by spraying, immersion or deposition. This embodiment allows the use of insulating oil and/or transformer oil to maintain quality. In particular, the transformer oil can prevent corrosion and/or damage to the core, the primary winding module, and/or the primary windings. It is particularly preferable for the oil-repellent protective layer to be embodied as a film, for example, a Hostaphan film. The protective layer, especially in the form of a film, improves the high-voltage strength of the X-ray generator. On the one hand, the film and/or the protective layer can help to reduce an oil gap in the coil body or X-ray generator and, on the other, thin layers like films are characterized by few defects and high dielectric strength.

There is optionally provision for the X-ray generator, specifically the high-voltage transformer, to have and/or comprise a filament heating module. The filament heating module is embodied to provide a heating current and/or a heating voltage, which can be used, for example, to heat a filament and/or a cathode of the X-ray tube. The filament heating module comprises at least one but specifically multiple windings. These windings are also referred to as filament windings for differentiation. The filament heating module comprises in particular a number N3 of filament windings. The filament windings are formed by a wire, for example. The filament windings are in particular arranged as a coil and/or form windings and/or a winding. The filament windings enclose, more particularly wrap around, the core in a filament section. The filament section can be arranged in the area of the primary section or the secondary section; alternatively, the filament section is not arranged in the primary or secondary section, or does not overlap the primary and/or secondary section. The magnetic field produced by the primary winding module is fed through the core at least in part in the filament heating module, or through the filament heating module, so that the time-varying magnetic field induces a current and/or a voltage in the filament heating module, which can be used to heat the filament. In particular, it is possible to facilitate a different transformation ratio for heating and/or for the heating current by using a winding number N3 that is not equal to the winding number N2.

According to an embodiment of the invention, there is a provision for the primary section to define a primary coil axis. The primary coil axis is in particular the axis, the cylinder axis, for example, around which the primary windings are arranged. Moreover, the secondary section defines a secondary coil axis. The secondary coil axis is in particular an axis, coil axis, and/or cylinder axis of the secondary winding module and/or the secondary windings. Furthermore, the filament section can define a filament coil axis. According to the embodiment, there is a provision in particular for the primary coil axis and the secondary coil axis to be rectified, preferably parallel and/or identical. In the event of concentric secondary windings and primary windings, for example, the secondary coil axis and primary coil axis are identical. If a frame and/or ring-shaped core are used, which comprise offset but parallel secondary windings and primary windings, on two opposite sides of the core, for example, there is a provision for parallel and thus rectified, but not identical, coil axes. The filament coil axis is preferably rectified, identical or parallel to the secondary coil axis or primary coil axis.

It is particularly preferable for the X-ray generator to have a generator tank. The generator tank is preferably embodied in the shape of a cube. The generator tank can be made from a metallic or non-metallic material, preferably a composite. The generator tank forms a hollow body for partial or complete accommodation of the high-voltage transformer. The high-voltage transformer is arranged in the generator tank and/or accommodated by the generator tank at least in sections. In other words, the side walls of the generator tank enclose the high-voltage transformer at least in part; for example, the side walls of the generator tank protect the high-voltage transformer to the bottom, right, left, front, and back. The generator tank is preferably open on one side, at the top, for example, so that a cover and/or cover module is used to close the generator tank. The generator tank is in particular impermeable to liquids, especially oils. The generator tank is also resistant to transformer oil. In particular, the high-voltage transformer is placed in the generator tank with transformer oil.

According to an embodiment of the invention, there is provision for the generator tank to have a tank opening. The tank opening should preferably be oriented upwards, with upwards being determined by use of the X-ray generator as intended, with the X-ray generator and/or generator tank being placed and/or arranged with a base area on the floor. In other words, the tank opening forms a recess in the shell of the generator tank. The cover module embodied to close off the tank opening and/or is arranged in the tank opening. For example, the cover module is embodied in the shape of a plate or as a board. The cover module can close off or fill the tank opening partially or completely.

It is particularly preferable for the cover module to comprise a circuit board and/or printed circuit board to conduct high voltage and/or current. For example, the cover module comprises current paths, such as copper conductors. The cover module can also comprise electrical components. The electrical components and/or conductor paths are arranged on an upper side of the circuit board and/or an upper side of the cover module. The circuit board and/or the cover module are electrically connected in particular to the high-voltage transformer, using feedthroughs and/or direct contacts, for example.

There can be a provision in particular for the high-voltage transformer, specifically the core, the secondary winding module, and/or the primary winding module, to be mechanically connected, with a material fit, or connected in a detachable or non-detachable manner.

The cover module should preferably have an upper side and a lower side. The circuit board and/or conductive elements and/or conductor paths are arranged in particular on an upper side. The lower side is oriented toward the inside of the generator tank; in particular, the lower side is oriented toward the high-voltage transformer, the core, the primary winding module, and/or secondary winding module. The upper side is arranged opposite the lower side. The lower side is connected mechanically, electrically, and/or via a material fit to the secondary winding module and/or the primary winding module.

The lower side of the cover module should particularly preferably be connected with a material fit to the plastic section at least in sections. For example, the lower side of the cover module can be glued to the plastic section. The lower side of the cover module should particularly preferably be embedded in the plastic section at least in sections. For example, the cover module, or the lower side of the cover module, is already mechanically connected to the plastic, such as soldered, glued, or welded, before the secondary winding module or the secondary windings are molded, so that the already connected lower side can be molded with the base material along with the secondary windings. This embodiment means that it is not necessary to connect the cover module, or the printed circuit board, to the high-voltage transformer, or the plastic section, at a later point, which makes it possible to prevent damage to the plastic section due to heat treatments, as can arise during soldering or welding.

It is particularly preferable for the core to be embodied in the shape of a frame. The shape of a frame means in particular an arrangement that is flat or defines a plane, which has a closed contour. For example, the core can define and/or form a rectangular frame, a ring-shaped frame, an elliptical frame, a polygonal frame, or a superelliptical frame. The core or the frame defines a core plane. The core plane is a curve-free plane in particular. The core should preferably be arranged in the generator tank so that the core plane and horizontal plane, such as the standing surface of the generator tank or the cover module, form an angle between 10° and 80°, specifically between 30° and 60°. In other words, the core should be arranged at an angle in the generator tank, so that the position of the high-voltage transformer is highly space-saving in the generator tank. In the case of standard X-ray generators, the core or the high-voltage transformer is usually arranged rectified to the horizontal or vertical plane, which results in particularly large or bulky transformers.

It is particularly preferable for the generator tank to be embodied in the shape of a cube, with the core being arranged so that the core plane sits in the generator tank at an angle and/or askew. In other words, the frame-shaped core is not arranged parallel to the horizontal plane or the base area and/or standing surface of the generator tank and is also not arranged perpendicular to the same.

According to an embodiment of the invention, the plastic of the plastic section is or comprises an epoxy resin. It is particularly preferable for the plastic of the plastic section, especially the epoxy resin, to have a material-dependent permeability value $\epsilon_r$ between 3.5 and 5 in its cured state, specifically between 4 and 4.5. While standard plastics and/or epoxy resins have a material-dependent permeability value of $\epsilon_r$ 6-8, the use of a plastic according to one or more example embodiments of the present invention is especially advantageous, as jumps between the permeability value of the different materials are particularly low.

An X-ray apparatus is also the subject matter of one or more example embodiments of the present invention. The X-ray apparatus can be a C-arm, a computed tomography unit or other medical apparatus used for X-raying. The X-ray apparatus comprises at least one X-ray tube and the X-ray generator. The X-ray generator is connected electrically to the X-ray tube to supply high voltage. In particular, the X-ray apparatus is embodied to operate the X-ray image tube, especially to supply it with the necessary operating voltage, heating current and/or voltage.

Figure 1:
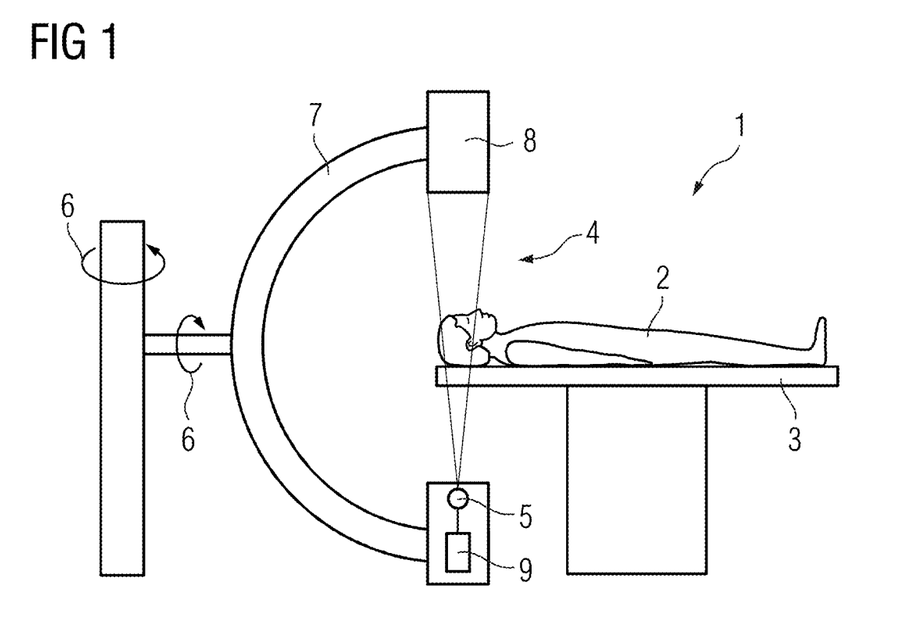
FIG. 1 shows an exemplary embodiment of an X-ray apparatus.

FIG. 1 shows an exemplary embodiment of an X-ray apparatus 1. The X-ray apparatus 1 is embodied as a C-arm. The X-ray apparatus 1 is used to take X-ray images of an examination object 2, a patient, for example. The examination object 2 is positioned on a patient table 3 for the X-ray images to be taken. The examination object can be positioned in an X-ray area 4 using the patient table 3. The X-ray area is irradiated with X-rays by an X-ray tube 5. The X-ray tube 5 is arranged at the end of a C-shaped arm, it being possible to rotate and/or swivel the arm 7 around multiple axes 6. A detector is arranged opposite the X-ray tube 5. The X-ray area 4 lies between the X-ray tube 5 and the detector 8.

To operate the X-ray tube 5, this is connected to an X-ray generator 9, with the X-ray generator 9 being embodied to supply the X-ray tube 5 with high voltage.

Figure 2:
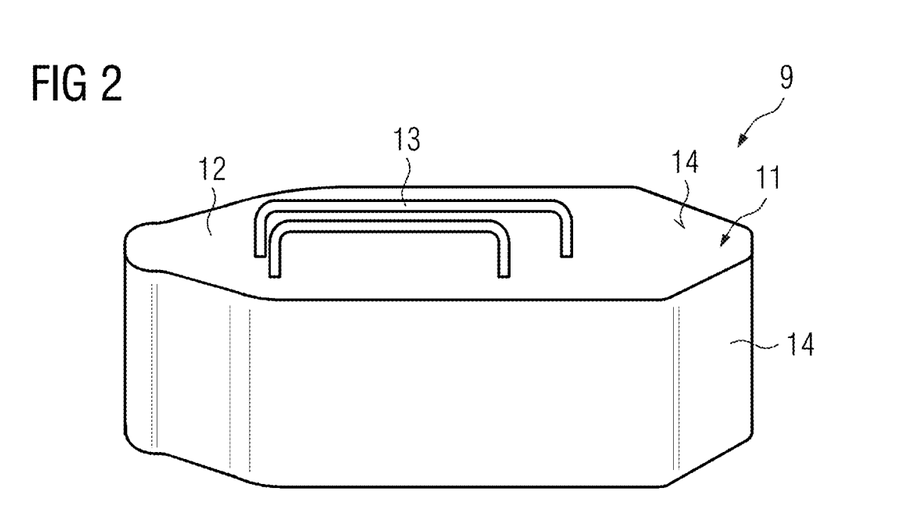
FIG. 2 shows an exemplary embodiment of an X-ray generator.

FIG. 2 shows an example of an X-ray generator 9, as it can be used to supply an X-ray tube 5 with high voltage. The X-ray generator 9 is embodied in particular for use in a C-arm, as shown in FIG. 1, for example, in computed tomography, or in emergency medicine. The X-ray generator can also be used in radiography, angiography, and/or fluoroscopy.

The X-ray generator 9 comprises a generator tank 10 and a high-voltage transformer 11. Part of the high-voltage transformer 11 is arranged within the generator tank 10, especially the greater part. The generator tank 10 is made from aluminum. Alternatively, the generator tank be made from a different metallic substance or a plastic, especially an oil-resistant plastic and/or a plastic that is chemically resistant to acids and/or alkalis. The generator tank 10 forms a hollow body and comprises a lower side, also called the base area or standing surface, a front wall, a back wall, and two side walls. The generator tank 10 is preferably filled with oil, especially filled with a transformer oil. The transformer oil surrounds the section of the high-voltage transformer 11 arranged in the generator tank 10.

The generator tank 10 has in particular a tank opening, which is preferably arranged opposite the base area. The tank opening is closed off by a cover module 12. The cover module 12 preferably comprises conductive elements, for example conductor paths. The cover module 12 comprises a printed circuit board 13, for example. The printed circuit board 13 and/or conductive elements are arranged in particular on an upper side 14. There is a lower side 20 on a side of the cover module 12 opposite the upper side.

Figure 3:
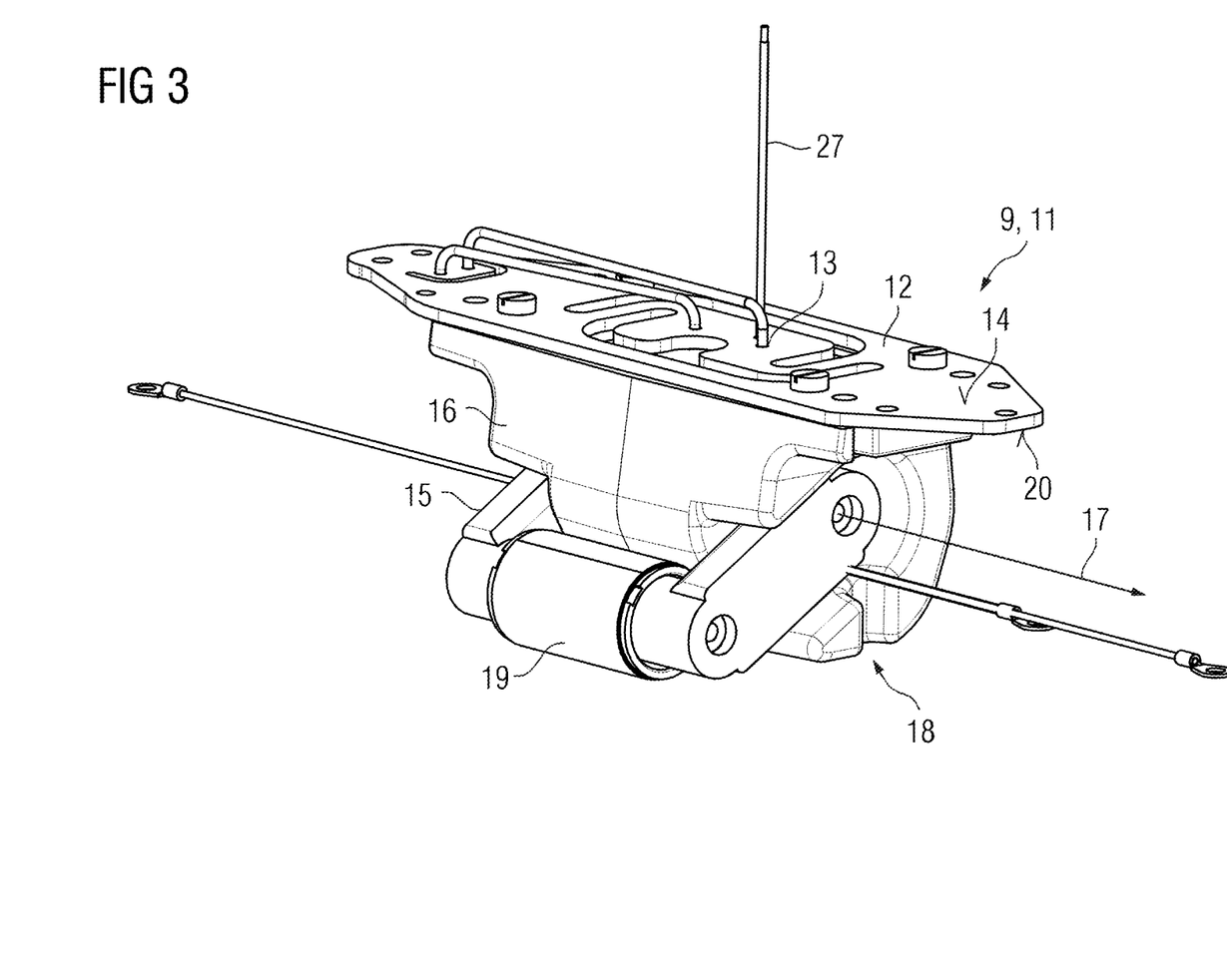
FIG. 3 shows a detailed view of an X-ray generator with a high-voltage transformer.

FIG. 3 shows a high-voltage transformer 11 as one part of the X-ray generator 9. The cover module 12 is embodied in a flat manner and is embodied as a plastic plate, for example. A plastic section 16 joins on to the lower side 20. The plastic section 16 can be connected with a material fit to the lower side 20 or the cover module 12, such as using adhesive or molding. Alternatively and/or additionally, the plastic section 16 is connected to the cover module 12 using screws, solder, a firm bond, form-fitting and/or force-fitting. The plastic section 16 is made from an epoxy resin. The plastic of the plastic section 16 is embodied in an electrically insulating manner. The plastic section 16 encloses a part and/or a section of a core 15.

The core 15 is surrounded by the high-voltage generator 11. The core 15 is made from a ferromagnetic material, such as iron and/or steel. The core 15 is embodied in the shape of a frame and has a rectangular contour, in particular four legs or side sections. Coils and/or winding modules are arranged on one of the legs or side parts to generate high voltage.

The section of the core 15 that comprises the winding modules defines a primary coil axis 17, which also forms the secondary coil axis here.

The core 15 is provided with an oil-repellent protective layer 19 at least in sections. One section of the core 15 is glued and/or laminated to a PET film as a protective layer 19, for example, with the PET film being oil-repellent. The core 15, along with the protective layer 19 and the winding modules intended to generate high voltage, is also known as the transformer base body. Information such as a serial number for example is lasered and/or stamped on to the transformer base body, especially a section of the core 15.

It has been established that routing cables only via a circuit board and/or printed circuit board is not sufficient to maintain voltages above 60 kV, as this results in partial discharges. The high-voltage wire 27 is provided to increase high-voltage strength. The high-voltage wire 27 is fed through from the secondary coil or the secondary winding module 26 and only soldered to the circuit board and/or printed circuit board 13 again at the output of the generator tank 10.

Figure 4:
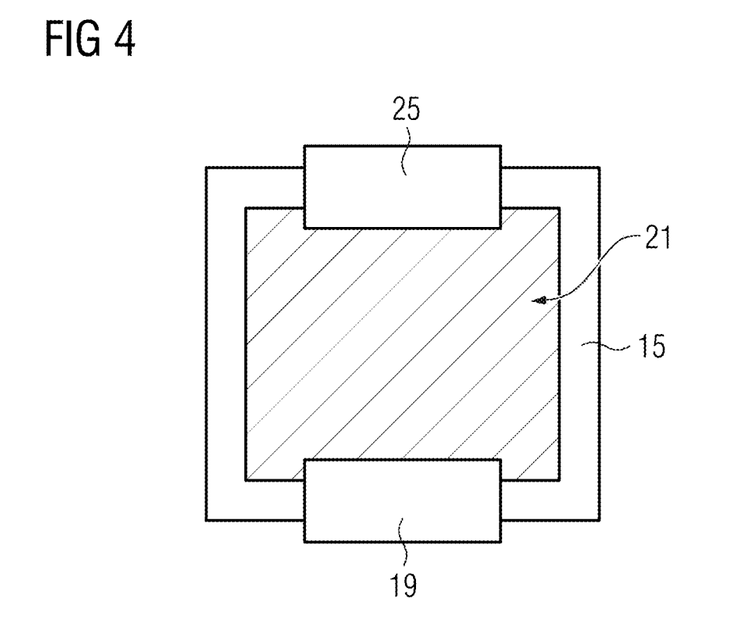
FIG. 4 shows an exemplary embodiment of a core of an X-ray generator.

FIG. 4 shows, by way of example, a section of an X-ray generator according to FIG. 3, with the section comprising the core 15. The frame-shaped core 15 defines a core plane 21. The core plane 21 is defined, for example, by the area and/or plane enclosed by the frame-shaped core 15. In particular, the primary coil axis and/or secondary coil axis 17 lies within the core plane 21.

Figure 5:
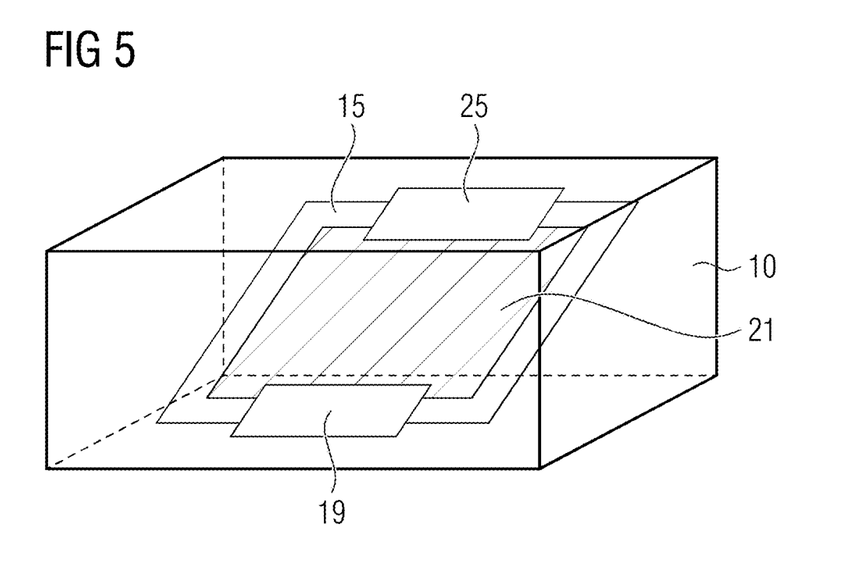
FIG. 5 shows a position of a core plane in a generator tank.

FIG. 5 shows an example of a preferred position of the core plane 21 in the generator tank 10. The generator tank 10 is embodied in the shape of a cube. The core plane 21 sits at an angle in the generator tank 10, so that the area enclosed by the core can be larger than the base area or side area of the generator tank 10. This arrangement makes it possible to provide a particularly compact X-ray generator 9.

Figure 6:
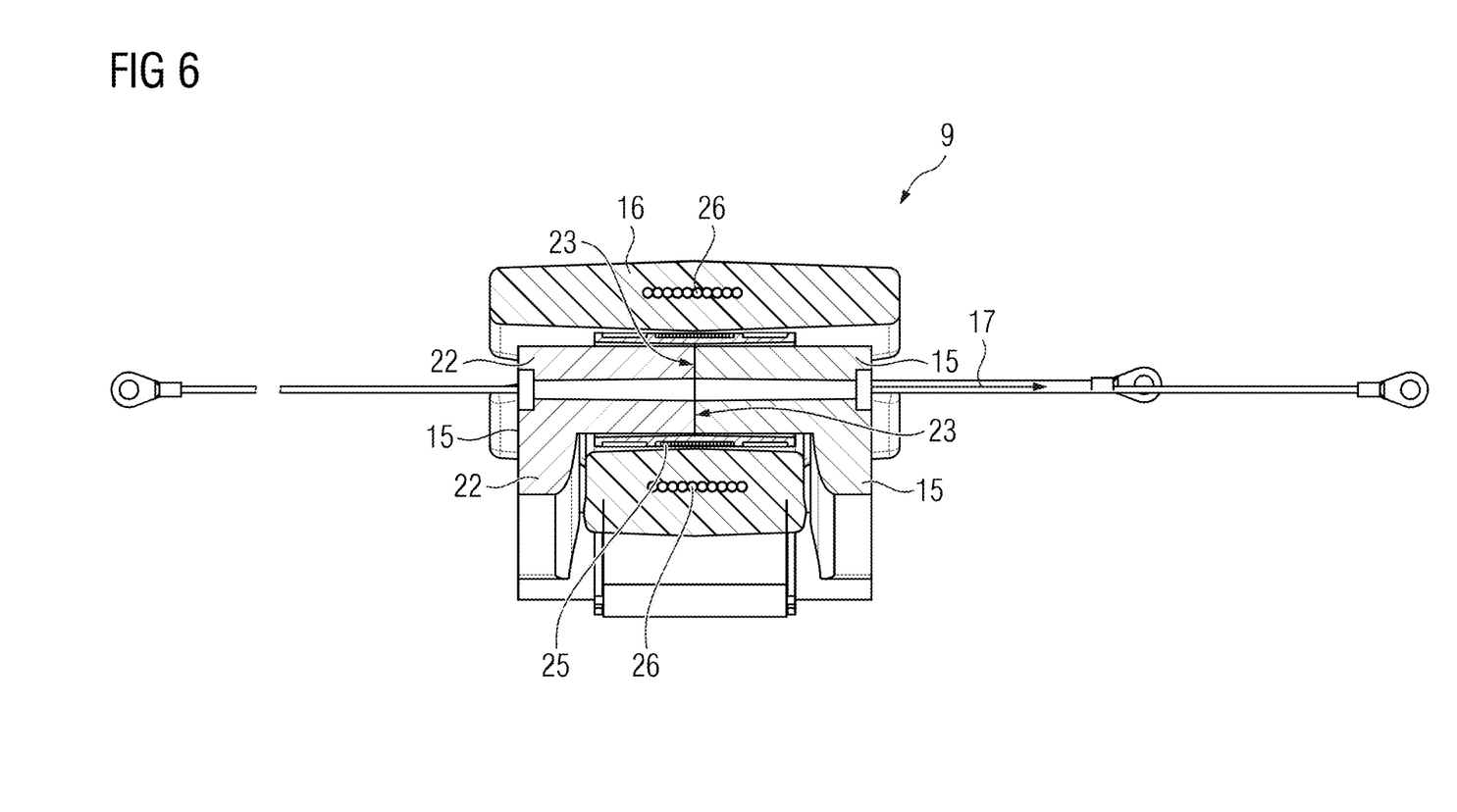
FIG. 6 shows a section of an X-ray generator.

FIG. 6 shows a section of the X-ray generator 9, especially of the high-voltage transformer 11. The section shown comprises two winding modules; the plastic section 16 is arranged around the core 15. The core 15 comprises two molded parts 22. The molded parts 22 form two halves of the frame-shaped core 15, for example. The molded parts 22 of the core 15 are connected to one another at a joint 23, particularly with a material fit. The molded parts 22 should preferably be glued at the joint 23.

A primary winding module 25 is arranged around the core 15, with the primary winding module 25 being one of the winding modules. The primary winding module 25 comprises multiple primary windings, which are embodied as coils around the core 15, for example. The primary winding module 25 and especially its windings are arranged in a primary section. The primary winding module 25 is enclosed by the plastic section 16 in a radially outward direction, with the plastic section 16 comprising a secondary winding module 26.

The secondary winding module 26 comprises multiple windings, which are arranged concentrically around the core 15, specifically around the primary winding module 25 and/or the windings of the primary winding module 25. The windings of the secondary winding module 26, especially the entire secondary winding module 26, are completely enclosed by the plastic section 16, so that the plastic section 16 electrically insulates the windings and/or the secondary winding module 26 to the outside.

The plastic section 16 is not connected with a material fit to the core 15, especially the primary winding module 25. In particular, the plastic section 16 can be rotated against it or adjusted in the primary section and/or secondary section.

Figure 7A:
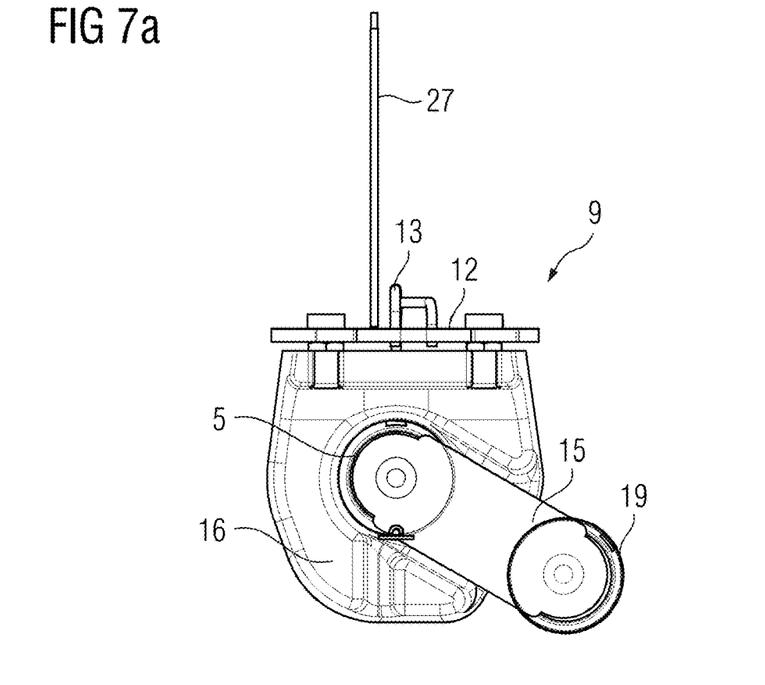
FIGS. 7a and 7b show a side view and a cross-section of the X-ray generator from FIG. 3.

FIG. 7*a* shows a side view of the section of the X-ray generator 9 from FIG. 3. The plastic section 16 is screwed to the cover module 12 here. The plastic section 16 comprises recesses, which partially form fit to the core 15. Aside from the section of the core 15 that comprises the primary and secondary section, the core 15 is arranged outside the plastic section 16. The core 15 is arranged at an angle to the surface of the cover module 12, with the cover module 12 being arranged parallel to the base area of the generator tank 10.

Figure 7B:
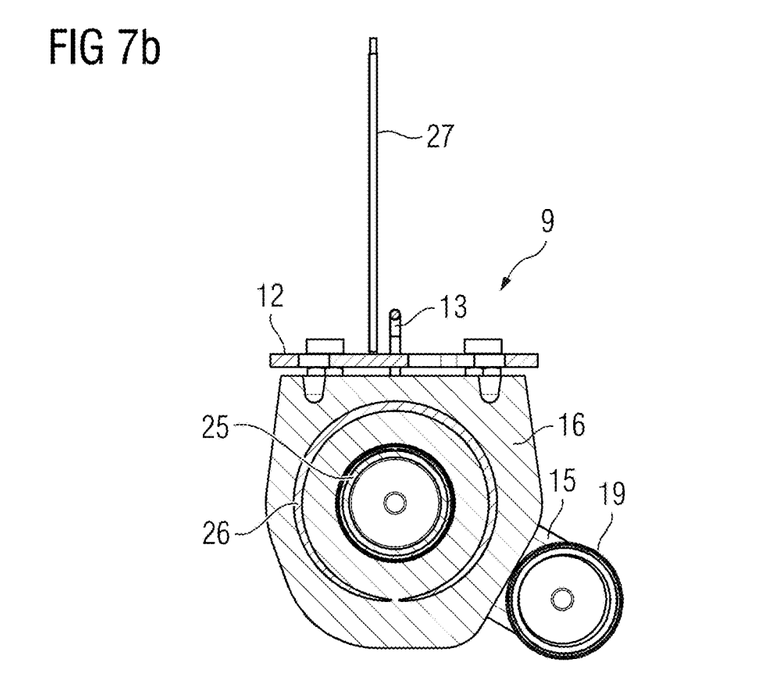

FIG. 7*b* shows a cross-section of the X-ray generator 9 from FIG. 7*a* looking in the same direction as in FIG. 7*a*. The cross-section shows that the primary winding module 25 and the secondary winding module 26, especially their windings, are arranged concentrically. The windings of the secondary winding module lie completely within the plastic section 16. The plastic section 16 comes into contact with the section of the core 15 arranged parallel to the primary coil axis 17. In particular, there is contact between the repellent protective layer 19 and the plastic section 16.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other steps or elements. The expression "a number of" means "at least one". The mention of a "unit" or a "device" does not preclude the use of more than one unit or device. The expression "a number of" has to be understood as "at least one".

It will be understood that, although the terms first, second, etc. be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device be otherwise oriented (rotated 90 degrees or at other orientations) and the spatially relative descriptors used herein interpreted accordingly. In addition, when an element is referred to as being "between" two elements, the element be the only element between the two elements, or one or more other intervening elements be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted occur out of the order noted in the figures. For example, two figures shown in succession in fact be executed substantially concurrently or sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments be described with reference to acts and symbolic representations of operations (e.g., in the form of flow charts, flow diagrams, data flow diagrams, structure diagrams, block diagrams, etc.) that be implemented in conjunction with units and/or devices discussed above. Although discussed in a particularly manner, a function or operation specified in a specific block be performed differently from the flow specified in a flowchart, flow diagram, etc. For example, functions or operations illustrated as being performed serially in two consecutive blocks actually be performed simultaneously, or in some cases be performed in reverse order. Although the flowcharts describe the operations as sequential processes, many of the operations be performed in parallel, concurrently or simultaneously. In addition, the order of operations be re-arranged. The processes be terminated when their operations are completed, but also have additional steps not included in the figure. The processes correspond to methods, functions, procedures, subroutines, subprograms, etc.

Specific structural and functional details disclosed herein are merely representative for purposes of describing example embodiments. The present invention however, be embodied in many alternate forms and should not be construed as limited to only the embodiments set forth herein.

Although described with reference to specific examples and drawings, modifications, additions and substitutions of example embodiments be variously made according to the description by those of ordinary skill in the art. For example, the described techniques be performed in an order different with that of the methods described, and/or components such as the described system, architecture, devices, circuit, and the like, be connected or combined to be different from the above-described methods, or results may be appropriately achieved by other components or equivalents.

Although the invention has been illustrated and described in greater detail by the preferred exemplary embodiment, the invention is not restricted by the disclosed examples and other variations can be derived herefrom by the person skilled in the art, without departing from the scope of protection of the invention.

The invention claimed is:

1. An X-ray generator comprising:
   a high-voltage transformer, the high-voltage transformer including,
      a core,
      a primary winding module including the primary windings enclosing a core in a primary section in a shape of a coil, and
      a secondary winding module including secondary windings and a plastic section made from a plastic, the secondary windings enclosing the core in a secondary section in the shape of the coil, the plastic section at least one of enclosing or comprising the secondary windings, the plastic forming an electrical insulator,
   wherein the primary section and the secondary section have a common overlap area, and
   the high-voltage transformer is configured to at least one of generate a voltage of at least 70 kV with respect to ground or act as a unipolar high-voltage transformer to output a voltage of at least 70 kV.

2. The X-ray generator of claim 1, wherein the secondary winding module and the core are decoupled mechanically, in terms of at least one of oscillation or vibration in the secondary section.

3. The X-ray generator of claim 2, wherein
   the core comprises at least two molded parts, and at least two of the molded parts in at least one of the secondary section or primary section are connected with a material fit.

4. The X-ray generator of claim 3, wherein at least one of the core, the primary winding module or the primary windings have an oil-repellent protective layer at least in sections.

5. The X-ray generator of claim 4, further comprising:
   a filament heating module configured to produce a heating current for a filament of an X-ray tube, the filament heating module including filament windings, wherein the filament windings enclose the core in a filament section in the shape of the coil.

6. The X-ray generator of claim 5, wherein at least one of the primary section defines a primary coil axis, the secondary section defines a secondary coil axis, or the filament section defines a filament coil axis, and at least one of the primary coil axis, the secondary coil axis or the filament coil axis are rectified.

7. The X-ray generator of claim 1, wherein the core comprises at least two molded parts, and at least two of the molded parts in at least one of the secondary section or primary section are connected with a material fit.

8. The X-ray generator of claim 1, wherein at least one of the core, the primary winding module or the primary windings have an oil-repellent protective layer at least in sections.

9. The X-ray generator of claim 1, further comprising:
a filament heating module configured to produce a heating current for a filament of an X-ray tube, the filament heating module including filament windings, wherein the filament windings enclose the core in a filament section in the shape of the coil.

10. The X-ray generator of claim 9, wherein at least one of the primary section defines a primary coil axis, the secondary section defines a secondary coil axis, or the filament section defines a filament coil axis, and at least one of the primary coil axis, the secondary coil axis or the filament coil axis are rectified.

11. The X-ray generator of claim 1, wherein the high-voltage transformer is in a generator tank.

12. The X-ray generator of claim 11, wherein the generator tank has a tank opening, and a cover module at least one of closes the tank opening or in the tank opening.

13. The X-ray generator of claim 12, wherein the cover module at least one of forms or comprises a circuit board to conduct at least one of high voltage or current.

14. The X-ray generator of claim 12, wherein the cover module has an upper side and a lower side, the lower side is oriented toward an inside of the generator tank, and the lower side is connected to the secondary winding module at least one of electrically or mechanically.

15. The X-ray generator of claim 14, wherein the lower side of the cover module is at least one of embedded, molded, or connected with a material fit to the plastic section at least in sections.

16. The X-ray generator of claim 11, wherein the generator tank is in a shape of a cube, the core is in a shape of a frame and defines a core plane, the core is in the generator tank such that the core plane sits in the generator tank at least one of at an angle or askew.

17. The X-ray generator of claim 1, wherein the core is in a shape of a frame and defines a core plane, wherein the core plane forms an angle of between 10° and 80° with a horizontal plane when the X-ray generator is operating normally.

18. The X-ray generator of claim 1, wherein the plastic of the plastic section at least one of comprises an epoxy resin or forms the epoxy resin.

19. The X-ray generator of claim 1, wherein the plastic of the plastic section has a material-dependent permittivity value $\epsilon_r$ between 3.5 and 5.

20. An X-ray apparatus comprising:
an X-ray tube; and
the X-ray generator of claim 1, wherein the X-ray generator is connected electrically to the X-ray tube to supply high voltage.

* * * * *